(12) United States Patent
Gonnella et al.

(10) Patent No.: US 9,651,661 B2
(45) Date of Patent: May 16, 2017

(54) METHODS AND SYSTEMS FOR LOCAL PRINCIPAL AXIS ROTATION ANGLE TRANSFORM

(71) Applicant: SRC, Inc., North Syracuse, NY (US)

(72) Inventors: James Gonnella, Syracuse, NY (US); Michael Robinson, Takoma Park, MD (US)

(73) Assignee: SRC, INC., North Syracuse, NY (US)

( * ) Notice: Subject to any disclaimer, the term of this patent is extended or adjusted under 35 U.S.C. 154(b) by 300 days.

(21) Appl. No.: 14/682,582

(22) Filed: Apr. 9, 2015

(65) Prior Publication Data

US 2016/0041262 A1   Feb. 11, 2016

Related U.S. Application Data

(60) Provisional application No. 61/977,293, filed on Apr. 9, 2014.

(51) Int. Cl.
*G01S 13/90* (2006.01)
*G01S 7/41* (2006.01)

(52) U.S. Cl.
CPC ............ *G01S 13/90* (2013.01); *G01S 7/414* (2013.01)

(58) Field of Classification Search
CPC ................................. G01S 13/90; G01S 7/414
USPC ...................................... 342/25 R–25 F, 191
See application file for complete search history.

(56) References Cited

U.S. PATENT DOCUMENTS

| | | | |
|---|---|---|---|
| 5,317,652 A | 5/1994 | Chatterjee | |
| 5,778,038 A | 7/1998 | Brandt et al. | |
| 6,046,695 A * | 4/2000 | Poehler | G01S 13/90 |
| | | | 342/25 A |

(Continued)

FOREIGN PATENT DOCUMENTS

| | | |
|---|---|---|
| CN | 101551450 | 10/2009 |
| CN | 103197286 | 7/2013 |

OTHER PUBLICATIONS

Chadhuri et al. "A Statistical Approach for Automatic Detection of Ocean Disturbance Features From SAR Images," IEEE Journal of Selected Topics in Applied Earth Observations and Remote Sensing, Aug. 2012. vol. 5, No. 4, pp. 1231-1242, http://ieeexplore.ieee.org/xpl/articleDetails.jsp?arnumber=6210409.

(Continued)

*Primary Examiner* — Marcus Windrich
(74) *Attorney, Agent, or Firm* — Bond Schoeneck & King, PLLC; George McGuire; Blaine Bettinger

(57) ABSTRACT

A method for processing synthetic aperture radar (SAR) data. The method includes the step of receiving SAR data that has been collected to provide a representation of a target scene, and dividing the data into a plurality of sub-blocks each having a plurality of pixels, each of the plurality of pixels having a coordinate and an amplitude. A transformation performed on each of the sub-blocks includes the steps of: (i) computing a mean coordinate; (ii) subtracting the mean coordinate from the pixel's actual coordinate to arrive at a modified coordinate; (iii) multiplying the modified coordinate by the amplitude to arrive at an amplitude-modified coordinate; (iv) creating a covariance matrix using the amplitude-modified coordinates; (v) performing a sin- (Continued)

gular value decomposition on the covariance matrix to arrive at a vector; and (vi) associating an angle with the calculated vector.

15 Claims, 9 Drawing Sheets

(56) References Cited

U.S. PATENT DOCUMENTS

| | | | |
|---|---|---|---|
| 6,628,844 B1 | 9/2003 | Benitz | |
| 6,822,606 B2 | 11/2004 | Ponsford et al. | |
| 7,574,057 B1 | 8/2009 | Yang | |
| 7,825,847 B2* | 11/2010 | Fujimura | G01S 7/025 342/188 |
| 8,116,522 B1* | 2/2012 | Buck | G06K 9/0063 382/103 |
| 9,196,044 B2* | 11/2015 | Ely | G06K 9/4647 |
| 2011/0273326 A1* | 11/2011 | Shirakawa | G01S 7/40 342/25 R |
| 2012/0112954 A1* | 5/2012 | Kurono | G01S 3/74 342/147 |
| 2013/0033394 A1* | 2/2013 | McCleary | G01S 13/90 342/25 A |

OTHER PUBLICATIONS

Lee et al., "On the estimation of radar polarization orientation shifts induced by terrain slopes," Geoscience and Remote Sensing, IEEE Transactions, 2002, vol. 40, No. 1, pp. 30,41 (see pp. 31-34), http://ieeexplore.ieee.org/stamp/stamp.jsp?tp=&arnumber=981347.

Qong, "A new scattering enhancement scheme for polarimetric SAR images based on covariance matrix," Geoscience and Remote Sensing Symposium, 2002, IGARSS '02. 2002 IEEE International, 2002, vol. 2, No., pp. 1023,1025, http://ieeexplore.ieee.org/stamp/stamp.jsp?tp=&arnumber=1025763.

Pawlowicz, "Quantitative visualization of geophysical flows using low-cost oblique digital time-lapse imaging," IEEE Journal of Oceanic Engineering, Oct. 2003. vol. 28, No. 4, pp. 699-710, http://ieeexplore.ieee.org/xpl/articleDetails.jsp?arnumber=1255515.

Xing et al., "A model incorporating orientation angle shift effect for polarimetric SAR calibration," Geoscience and Remote Sensing Symposium (IGARSS), 2011 IEEE International, 2011, pp. 463,466 (see pp. 463-464), http://ieeexplore.ieee.org/stamp/stamp.jsp?tp=&arnumber=6049165.

* cited by examiner

|   K   |       |
|-------|-------|
| Pixel 1 | Pixel 2 |
| Pixel 3 | Pixel 4 |

| $D$ | | |
|-----|-----|-----|
| $x_1$ | $y_1$ | $A_1$ |
| $x_2$ | $y_2$ | $A_2$ |
| $x_3$ | $y_3$ | $A_3$ |
| $x_4$ | $y_4$ | $A_4$ |

FIG. 2B

METHODS AND SYSTEMS FOR LOCAL PRINCIPAL AXIS ROTATION ANGLE TRANSFORM

CROSS-REFERENCE TO RELATED APPLICATIONS

This application claims priority to U.S. Provisional Patent Application Ser. No. 61/977,293, filed on Apr. 9, 2014 and entitled "Methods and Systems for Local Principal Axis Rotation Angle Transform," the entire disclosure of which is incorporated herein by reference.

STATEMENT OF GOVERNMENT INTEREST

The invention was made with United States Government support under Project No. 2009*1266522*000 under a Mohawk3 contract. The United States Government has certain rights in this invention.

FIELD OF THE INVENTION

The present invention is directed generally to methods and systems for maritime imagery and, more particularly, to methods for enhancing the detection of target features in maritime imagery.

BACKGROUND

Traditional methods for the detection of ship and turbulence in water typically required extensive human interaction, including visual inspection of every aerial photograph. Reviewers look for visible objects like ships, wakes left by vehicles moving through the water, and ocean turbulence, among other visible objects. Computers are also used to scan aerial photographs in digital form for the presence of visible objects.

However, there is an upper limit to how many photographs can be reviewed by a single human during any given period of time, and visual inspection by human eyes is not always accurate or consistent. Although computers provide consistency when scanning images for visible objects, these objects are often confused with natural phenomenon such as waves, whiteheads, and other objects. As a result, existing methods for reviewing aerial or satellite imagery of maritime surfaces are both time-consuming and inaccurate.

Accordingly, there is a need for quick and efficient image processing methods, systems, and algorithms to assist with the accurate detection of target features in maritime imagery.

SUMMARY OF THE INVENTION

The present disclosure is directed to systems and methods for enhancing the detection of target features in maritime imagery. According to an aspect is provided a method, system, and algorithm for using radar imagery, such as synthetic-aperture radar imagery, of a body of water and enhance the visibility of phenomena related to, for example, the presence of ocean vessels and submarines.

According to an aspect is a method for processing synthetic aperture radar (SAR) data, the method comprising the steps of: receiving a plurality of SAR data that has been collected to provide a representation of a target scene; dividing the collected SAR data for the target scene into a plurality of sub-blocks, each of the plurality of sub-blocks comprising a plurality of pixels, each of the plurality of pixels comprising a coordinate and an amplitude; and applying a local principal axis rotation transformation to each of the plurality of sub-blocks. The local principal axis rotation transformation includes the steps of: (i) computing, for a sub-block, a mean coordinate using the coordinates for the plurality of pixels in the sub-block; (ii) subtracting, for each of the plurality of pixels in the sub-block, the mean coordinate from the pixel's actual coordinate to arrive at a modified coordinate; (iii) multiplying, for each of the plurality of pixels in the sub-block, the modified coordinate by the amplitude to arrive at an amplitude-modified coordinate; (iv) creating a covariance matrix using the amplitude-modified coordinates; (v) performing a singular value decomposition on the covariance matrix to arrive at a vector; and (vi) associating a unique angle with the vector.

According to an embodiment, the method includes the step of mapping the calculated angles on the target scene.

According to an embodiment, each angle is associated with a color intensity.

According to an embodiment, the target scene is a maritime scene.

According to an embodiment, the SAR data is collected by airplane.

According to an embodiment, the SAR data is collected by satellite.

According to an embodiment, the step of providing a plurality of receiving SAR data comprises the steps of: obtaining receiving SAR data for each of a plurality of target scenes; and storing the receiving SAR data in memory for analysis.

According to an aspect is a system for processing synthetic aperture radar (SAR) data, the system comprising: a non-transitory memory comprising a plurality of receiving SAR data that has been collected to provide a representation of a target scene; and a processor, the processor programmed to divide the collected SAR data for the target scene into a plurality of sub-blocks, each of the plurality of sub-blocks comprising a plurality of pixels, each of the plurality of pixels comprising a coordinate and an amplitude. The processor is also configured to apply a local principal axis rotation transformation to each of the plurality of sub-blocks, the local principal axis rotation transformation comprising the steps of: (i) computing, for a sub-block, a mean coordinate using the coordinates for the plurality of pixels in the sub-block; (ii) subtracting, for each of the plurality of pixels in the sub-block, the mean coordinate from the pixel's actual coordinate to arrive at a modified coordinate; (iii) multiplying, for each of the plurality of pixels in the sub-block, the modified coordinate by the amplitude to arrive at an amplitude-modified coordinate; (iv) creating a covariance matrix using the amplitude-modified coordinates; (v) performing a singular value decomposition on the covariance matrix to arrive at a vector; and (vi) associating a unique angle with the vector.

According to an embodiment, the system further includes a SAR radar configured to obtain a plurality of receiving SAR data for the target scene.

According to an embodiment, the processor is further configured to receive the plurality of receiving SAR data for the target scene and store the data in the non-transitory memory.

These and other aspects of the invention will be apparent from and elucidated with reference to the embodiment(s) described hereinafter.

BRIEF DESCRIPTION OF THE DRAWINGS

The present invention will be more fully understood and appreciated by reading the following Detailed Description in conjunction with the accompanying drawings, in which:

FIG. 2A is an image to be analyzed in accordance with an embodiment.

FIG. 2B is an array D in accordance with an embodiment.

DETAILED DESCRIPTION

The present disclosure is directed to rapid and efficient systems and methods for enhancing the accurate detection of target features in maritime imagery. According to an aspect, images are obtained of a body of water and then analyzed in order to accurately detect phenomena related to targets such as ocean vessels and submarines, among other possible maritime targets.

Figure 1:
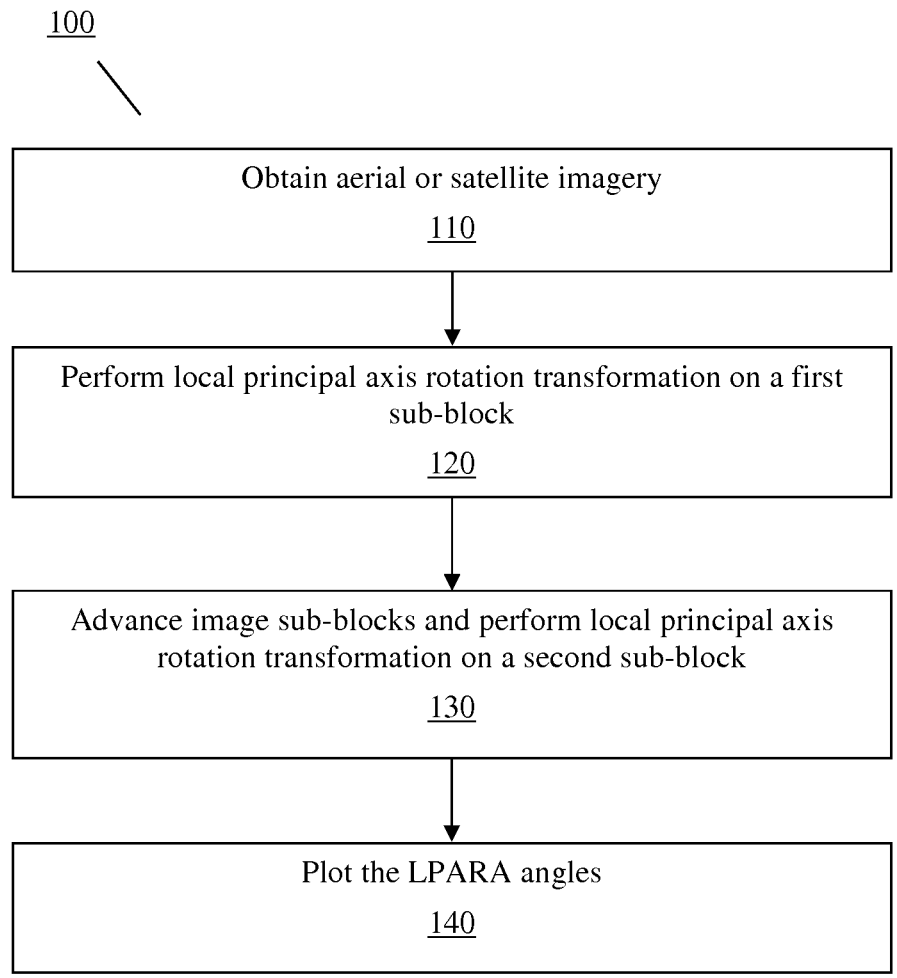
FIG. 1 is a flowchart of a method for target detection in maritime images, in accordance with an embodiment.

Referring to FIG. 1 is a flowchart of a method 100 for target detection in maritime images, in accordance with an embodiment. At step 110 of the method, images of a maritime surface are received or obtained. The maritime surface is typically all or part of an ocean, river, lake, pond, stream or other body of water whether still, moving, or both. In many cases the maritime surface may include land, including islands, shores, beaches, isthmuses, and other land typically associated with bodies of water. The images may be aerial images taken from an airplane, drone, balloon, or other flying instrument, or can also be taken by satellite, among other possibilities. The images may be obtained directly for analysis, or can be obtained from a database or provider for analysis. For example, the images may be historical, or may be recent images that were stored for later analysis. As another example, the images may be purchased from a third-party entity that is in the business of taking satellite imagery.

As just one example, the images can be obtained by synthetic-aperture radar, a type of radar used to create 2D or 3D images of a surface or object. SAR operates using the motion of the SAR antenna over the target surface in order to provide increased spatial resolution. The SAR is typically mounted on an aircraft or satellite, and the distance that the SAR-mounted aircraft or satellite travels over the surface creates a synthetic antenna aperture that is far larger than the actual physical aperture, thereby greatly increasing the resolution of the obtained radar images.

In order to prepare the images for downstream analysis, they may undergo an initial processing step. For example, the images may be categorized, ordered, divided or binned, or otherwise processed. As yet another example, the images may undergo an initial screen to prioritize or otherwise determine processing order, intensity, or other analysis characteristics.

At step 120 of the method depicted in FIG. 1, an image undergoes a transformation step. For example, a processor associated with the database or an image feeding module receives an image and then performs the transformation step. According to one embodiment, the processor performs a local principal axis rotation transform ("LPARA"). The LPARA transform is used on maritime SAR amplitude imagery, and it enhances maritime features such as ship wakes and ocean turbulence. According to one embodiment, the inputs to the transform are: (1) the image, which will be an M by N array of positive numbers; (2) the horizontal (with length N) and the vertical (with length M) axes; (3) a sub-block size (K by J); and (4) a sub-block advance (A by B). The sub-block size and the sub-block advance are variable, and can be pre-programmed or can be determined based on a variety of factors such as the number of images to be processed, among many others. The output of the transform, therefore, is an array of angles whose size is roughly M/A by N/B. According to an embodiment, an angle is computed for a sub-block K by J array of pixels. At step 130 of the method depicted in FIG. 1, the sub-blocks are advanced by B pixels horizontally and A pixels vertically.

According to an embodiment, the angle is computed for a given sub-block of pixels according to the following procedure. Each pixel has an associated amplitude A, horizontal coordinate x, and vertical coordinate y. A mean coordinate weighted by amplitude is computed and then subtracted from the actual coordinates of the pixel.

According to an embodiment, the mean coordinate weighted by amplitude is calculated using the following method, although other methods are possible. Each x,y coordinate in the given sub-block of pixels is weighted by the intensity of the pixel at that location. For example, if the pixel at coordinates x,y has intensity A, then the new weighted coordinate is (A*x,A*y). All of the weighted coordinates in the sub-block are then weighted to obtain the mean coordinate, which is then subtracted from all the weighted coordinates in the sub-block.

Upon subtracting the weighted mean coordinate from the actual coordinates of the pixel, there is now a two column array D of x/y coordinates, as shown in FIG. 2B, where the number of rows in this array is the product of J and K as shown in FIG. 2A. Each row of the D array is then multiplied by the associated amplitude. Next a 2 by 2 covariance matrix R is formed by R=D'*D.

Next, a singular value decomposition is performed on R and the vector U associated with the first singular value is retained. Without loss of generality it can be assumed that the first component of U is positive so that a unique angle $\theta$ can be associated with U where $-90<=\theta<=90$. This is the LPARA angle associated with each given sub-block. According to an embodiment, the absolute value of this angle can be utilized.

Figure 3:
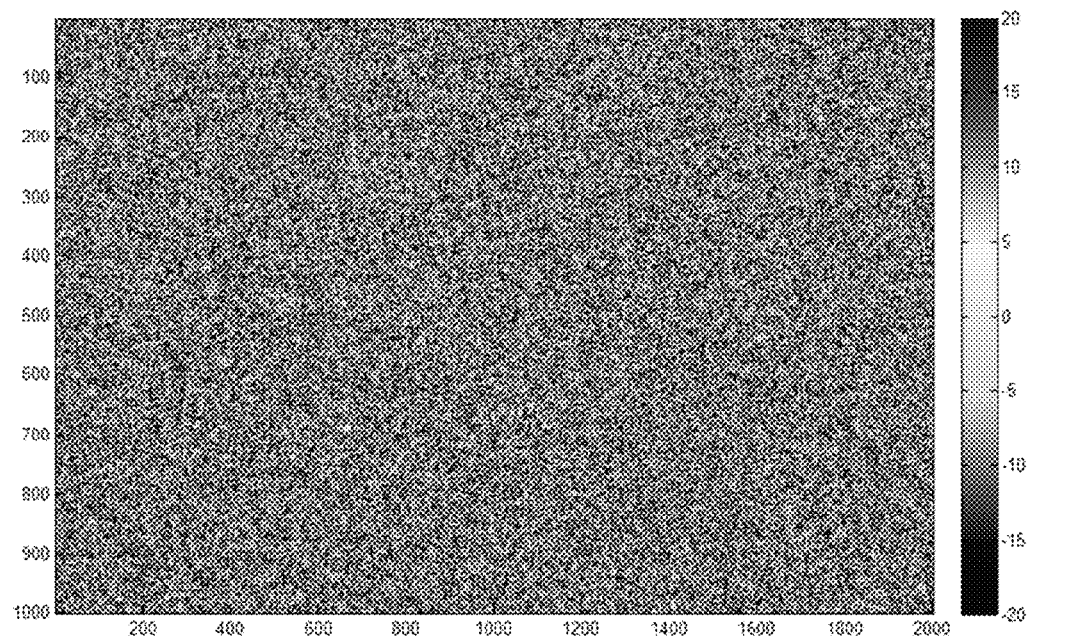
FIG. 3 is a simulated image in accordance with an embodiment.
Figure 4:
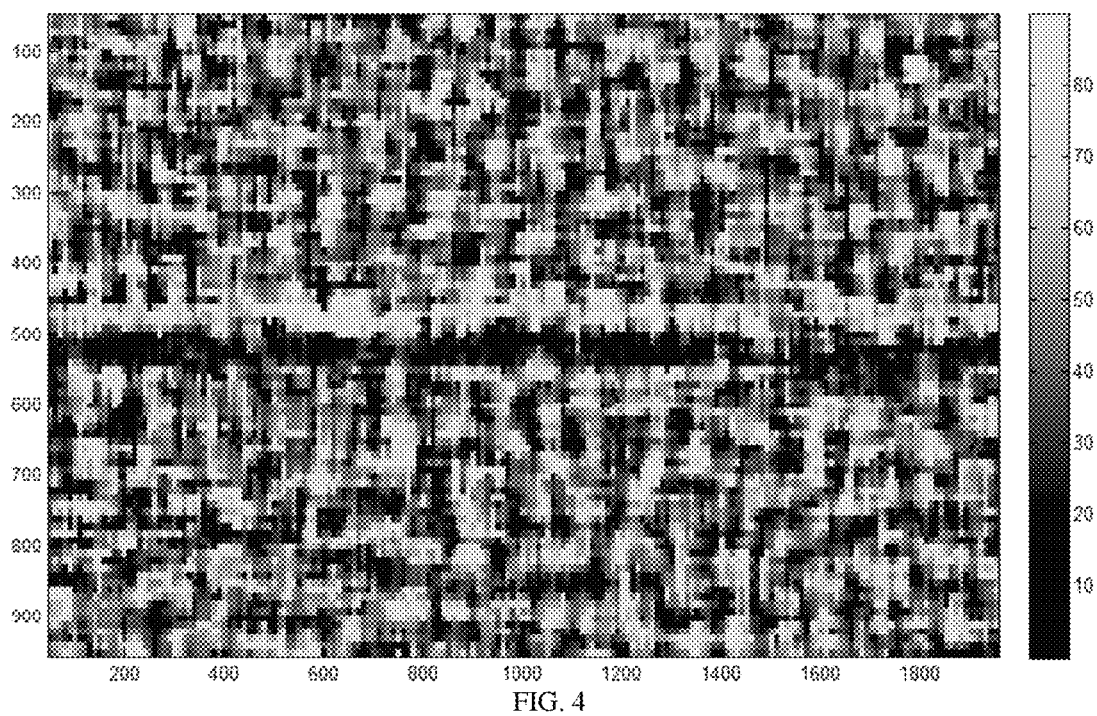
FIG. 4 is a graph of the LPARA transformation of the simulated image of FIG. 3, in accordance with an embodiment.

Next, at step 140 of the method, the calculated angles are plotted on the image. For example, the angle of each pixel is plotted on that pixel as part of the entire original image or a portion of the original image. The angle can be associated with a color or color intensity, thereby providing a map of LPARA angles. As shown by comparing FIGS. 3 and 4, for example, it is shown that FIG. 3 is an original image prior to the LPARA transformation, and FIG. 4 is the plot of the LPARA angles on the original image. This allows a processor or human to analyze the image for anomalies that can then be pursued or identified for additional analysis.

LPARA Examples

Figure 5:
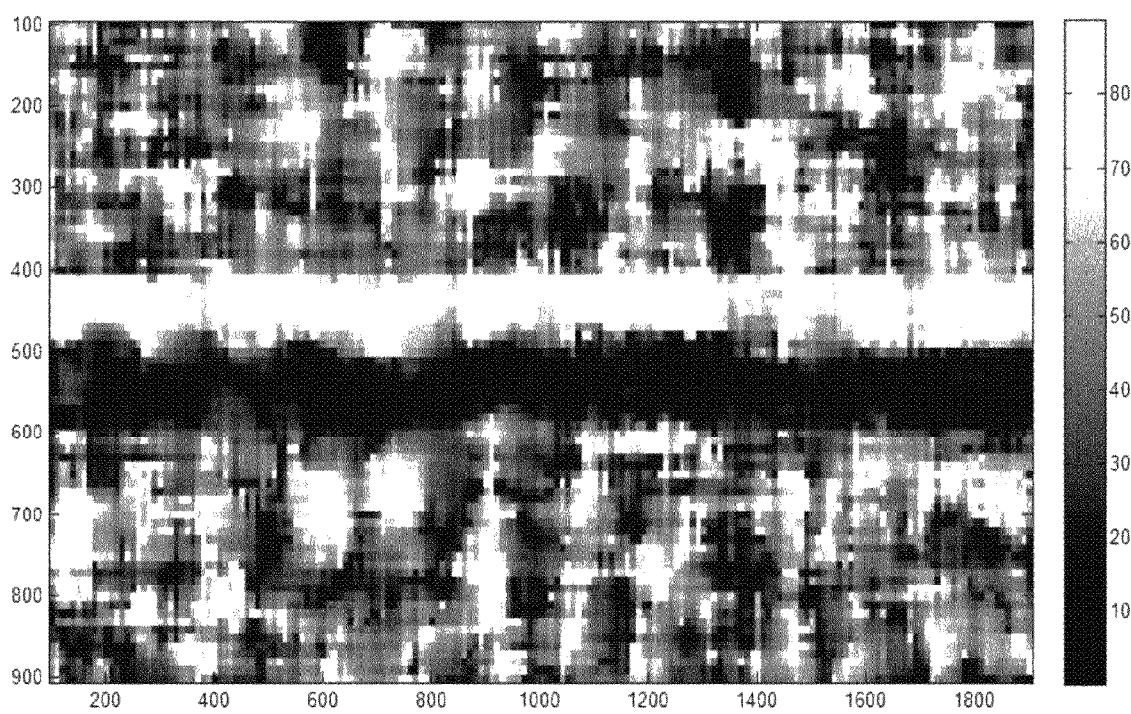
FIG. 5 is a graph of the LPARA transformation of the simulated image of FIG. 3, in accordance with an embodiment.

The LPARA transformation and mapping can be analyzed using simulated data. For example, as shown in FIG. 3, is an image consisting only of Gaussian noise, which can be generated by a randomizer, processor, or other computing element. The image size in this example is 1000 by 2000 pixels, although other sizes are possible. The noise power in half of the image is 10% greater than the other half, in this example. The boundary between the two halves may be horizontal, vertical, or diagonal, but at this level of difference it is impossible to visually distinguish the two halves. Referring to FIGS. 4 and 5, however, the boundary between the first half and the second half becomes clear with a LPARA transformation. In FIG. 4, the image is broken into 100 by 100 pixel sub-blocks prior to the LPARA transformation. In FIG. 5, the image is broken into 200 by 200 pixel sub-blocks prior to the LPARA transformation.

Figure 6:
FIG. 6 is an image to be analyzed in accordance with an embodiment.
Figure 7:
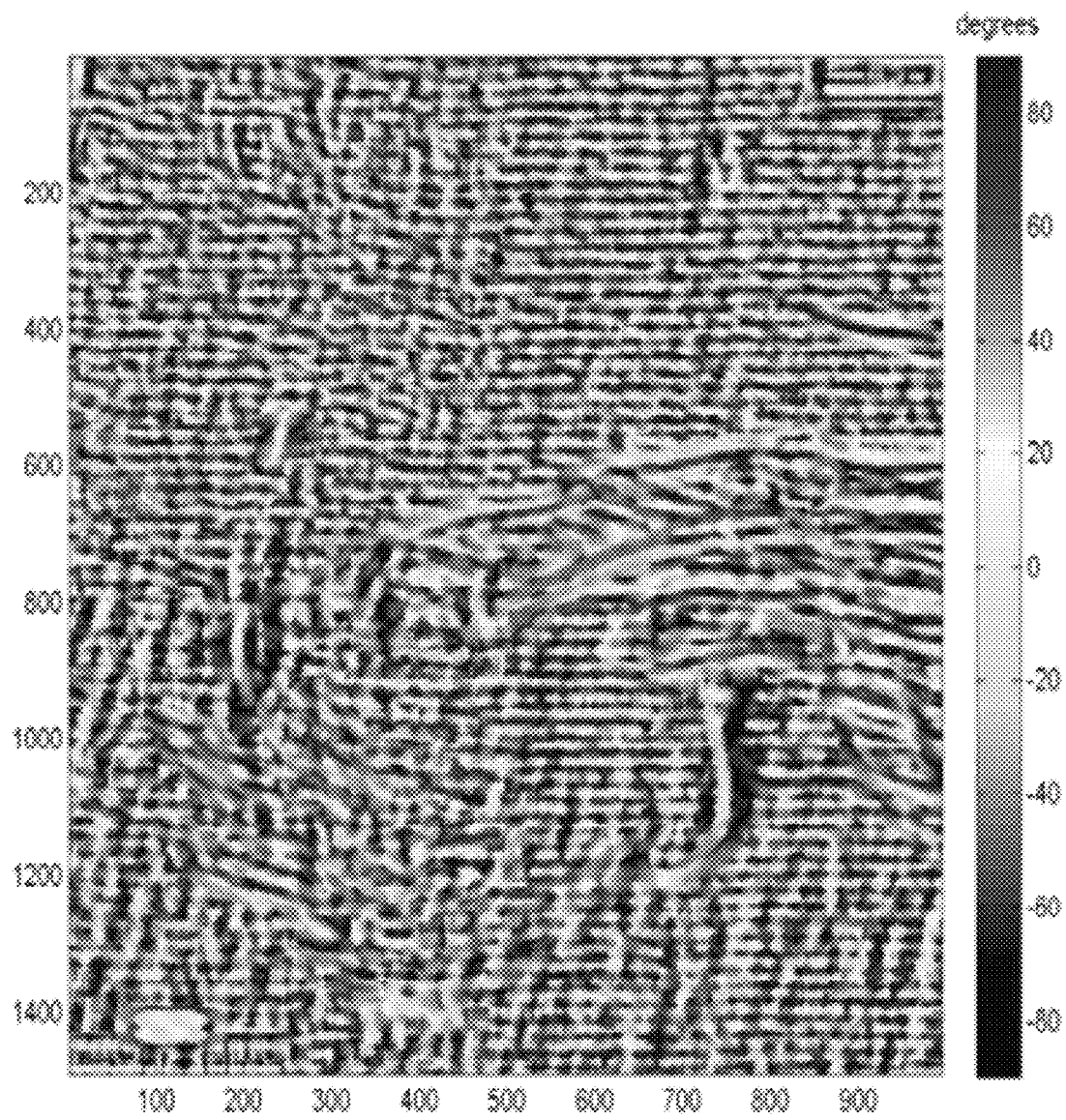
FIG. 7 is a graph of the LPARA transformation of the image of FIG. 6, in accordance with an embodiment.
Figure 8:
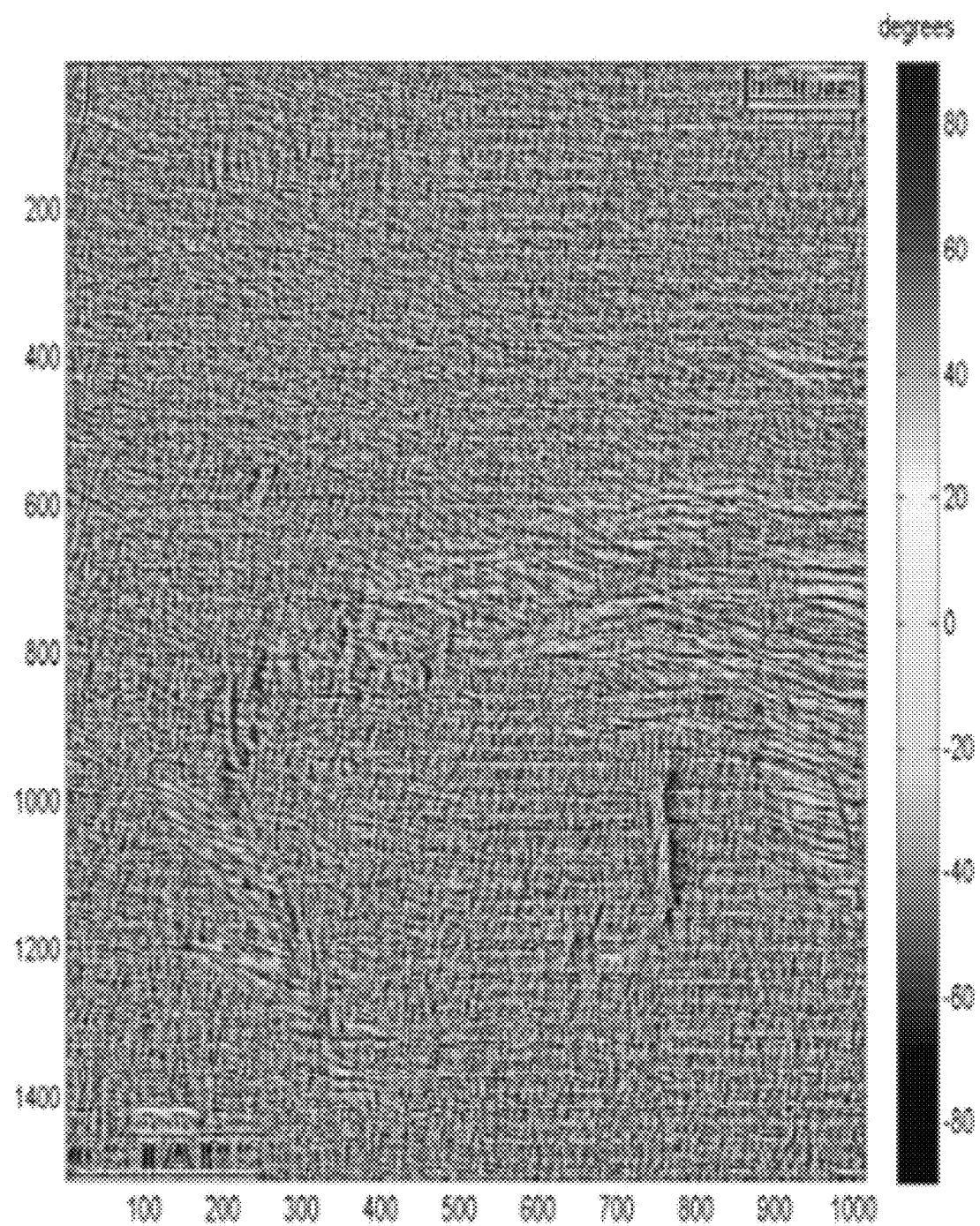
FIG. 8 is a graph of the LPARA transformation of the image of FIG. 6, in accordance with an embodiment.

With the transformation method confirmed, the transformation can be applied to real-life images. Referring to FIGS. 6, 7, and 8 are examples of images before and after LPARA transforms. FIG. 6, for example, is a maritime image as might be captured by an airplane or satellite. The LPARA transformation is performed on blocks of pixels and the result is shown in FIGS. 7 and 8. In FIG. 7, the image is broken into 30 pixel sub-blocks prior to the LPARA transformation. In FIG. 8, the image is broken into 10 pixel sub-blocks prior to the LPARA transformation.

Figure 9:
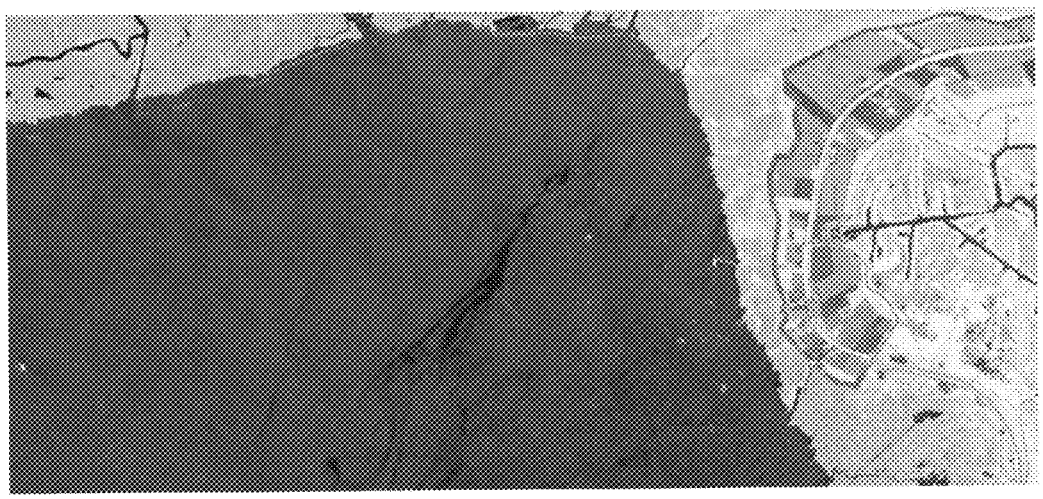
FIG. 9 is an image to be analyzed in accordance with an embodiment.
Figure 10:
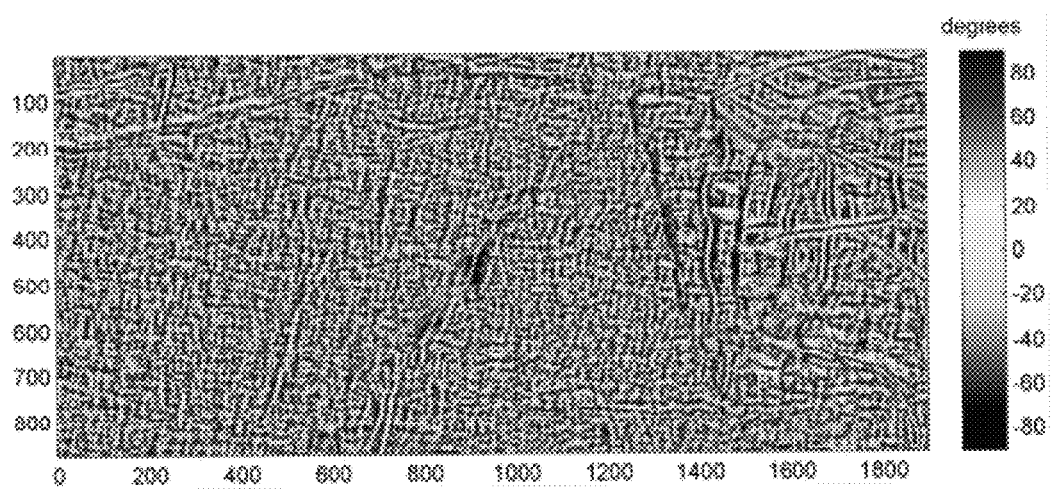
FIG. 10 is a graph of the LPARA transformation of the image of FIG. 9, in accordance with an embodiment.
Figure 11:
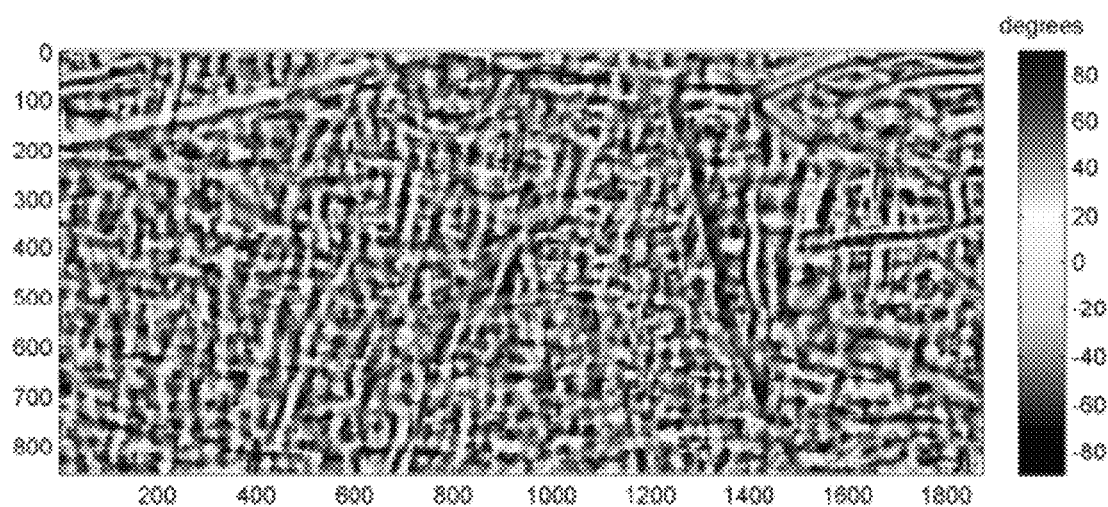
FIG. 11 is a graph of the LPARA transformation of the image of FIG. 9, in accordance with an embodiment.

Similarly, referring to FIGS. 9, 10, and 11 are examples of images before and after LPARA transforms. FIG. 9, for example, is a maritime image as might be captured by an airplane or satellite. The LPARA transformation is performed on blocks of pixels and the result is shown in FIGS. 10 and 11. In FIG. 10, the image is broken into 30 pixel sub-blocks prior to the LPARA transformation. In FIG. 11, the image is broken into 10 pixel sub-blocks prior to the LPARA transformation.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Any flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for processing synthetic aperture radar (SAR) data, the method comprising the steps of:

receiving a plurality of SAR data that has been collected to provide a representation of a target scene;

dividing, using a processor the collected SAR data for the target scene into a plurality of sub-blocks, each of the plurality of sub-blocks comprising a plurality of pixels, each of the plurality of pixels comprising a coordinate and an amplitude;

applying a local principal axis rotation transformation to each of the plurality of sub-blocks, the local principal axis rotation transformation comprising the steps of:
  (i) computing, for a sub-block, a mean coordinate using the coordinates for the plurality of pixels in the sub-block;
  (ii) subtracting, for each of the plurality of pixels in the sub-block, the mean coordinate from the pixel's actual coordinate to arrive at a modified coordinate;
  (iii) multiplying, for each of the plurality of pixels in the sub-block, the modified coordinate by the amplitude to arrive at an amplitude-modified coordinate;
  (iv) creating a covariance matrix using the amplitude-modified coordinates;
  (v) performing a singular value decomposition on the covariance matrix to arrive at a vector; and
  (vi) associating an angle with the calculated vector.

2. The method of claim 1, further comprising the step of mapping the calculated angles on the target scene.

3. The method of claim 2, wherein each angle is associated with a color intensity.

4. The method of claim 1, wherein the target scene is a maritime scene.

5. The method of claim 1, wherein the SAR data is collected by airplane.

6. The method of claim 1, wherein the SAR data is collected by satellite.

7. The method of claim 1, wherein the step of providing a plurality of receiving SAR data comprises the steps of: obtaining receiving SAR data for each of a plurality of target scenes; and storing the receiving SAR data in memory for analysis.

8. A system for processing synthetic aperture radar (SAR) data, the system comprising:
  a non-transitory memory comprising a plurality of receiving SAR data that has been collected to provide a representation of a target scene; and
  a processor, the processor programmed to divide the collected SAR data for the target scene into a plurality of sub-blocks, each of the plurality of sub-blocks comprising a plurality of pixels, each of the plurality of pixels comprising a coordinate and an amplitude;
  wherein the processor is further configured to apply a local principal axis rotation transformation to each of the plurality of sub-blocks, the local principal axis rotation transformation comprising the steps of:
    (i) computing, for a sub-block, a mean coordinate using the coordinates for the plurality of pixels in the sub-block;
    (ii) subtracting, for each of the plurality of pixels in the sub-block, the mean coordinate from the pixel's actual coordinate to arrive at a modified coordinate;
    (iii) multiplying, for each of the plurality of pixels in the sub-block, the modified coordinate by the amplitude to arrive at an amplitude-modified coordinate;
    (iv) creating a covariance matrix using the amplitude-modified coordinates;
    (v) performing a singular value decomposition on the covariance matrix to arrive at a vector; and
    (vi) associating an angle with the calculated vector.

9. The system of claim 8, wherein the processor is further configured to map the calculated angles on the target scene.

10. The system of claim 9, wherein each angle is associated with a color intensity.

11. The system of claim 8, wherein the target scene is a maritime scene.

12. The system of claim 8, wherein the SAR data is collected by airplane.

13. The system of claim 8, wherein the SAR data is collected by satellite.

14. The system of claim 8, wherein the system further comprises:
  a SAR radar configured to obtain a plurality of receiving SAR data for the target scene.

15. The system of claim 14, wherein the processor is further configured to receive the plurality of receiving SAR data for the target scene and store the data in the non-transitory memory.

* * * * *